(12) United States Patent
Barbaresco (10) Patent No.: US 8,334,799 B2
(45) Date of Patent: Dec. 18, 2012

(54) METHOD FOR RADAR MONITORING OF WAKE TURBULENCE (75) Inventor: Frédéric Stéphane Barbaresco, Montgeron (FR)

(73) Assignee: Thales, Neuilly sur Seine (FR)

( * ) Notice: Subject to any disclaimer, the term of this patent is extended or adjusted under 35 U.S.C. 154(b) by 210 days.

(21) Appl. No.: 12/598,073

(22) PCT Filed: May 13, 2008

(86) PCT No.: PCT/EP2008/055864
§ 371 (c)(1),
(2), (4) Date: Jan. 6, 2010

(87) PCT Pub. No.: WO2008/141983
PCT Pub. Date: Nov. 27, 2008

(65) Prior Publication Data
US 2010/0117892 A1  May 13, 2010

(30) Foreign Application Priority Data
May 15, 2007 (FR) ..................................... 07 03479

(51) Int. Cl.
*G01S 13/95* (2006.01)
*G01S 13/00* (2006.01)

(52) U.S. Cl. ................... 342/26 R; 342/26 B; 342/26 D; 342/175; 342/192; 342/195; 342/196

(58) Field of Classification Search .......... 342/26 R–28, 342/89–103, 175, 192–197, 36; 73/170.01, 73/170.11–170.15, 178 R; 244/1 R; 340/945, 340/963, 968
See application file for complete search history.

(56) References Cited

U.S. PATENT DOCUMENTS

| 3,251,057 | A | * | 5/1966 | Buehler et al. | ............. | 342/26 D |
| 3,359,557 | A | * | 12/1967 | Fow et al. | .................. | 342/26 B |
| 3,404,396 | A | * | 10/1968 | Buchler et al. | ............. | 342/26 B |
| 3,465,339 | A | * | 9/1969 | Marner | ....................... | 342/26 B |
| 3,491,358 | A | * | 1/1970 | Hicks | .......................... | 342/26 R |

(Continued)

FOREIGN PATENT DOCUMENTS

EP     1197763 A2    4/2002

(Continued)

OTHER PUBLICATIONS

Gerz, et al, 2005. "Research towards a wake-vortex advisory system for optimal aircraft spacing." Comptes Rendus Physique 6 (4-5): 501-523.

(Continued)

*Primary Examiner* — Bernarr Gregory
(74) *Attorney, Agent, or Firm* — Stroock & Stroock & Lavan LLP (57) ABSTRACT

Detecting and grading the state and evolution of wake turbulence caused by an aircraft is made on the basis of radar signals reflected by this turbulence, these signals being analyzed through analysis cells of given dimension in terms of distance and bearing. A first preliminary detection step detects and locates turbulence in a cell. A second step determines the strength of the detected turbulence, while a third step determines the age of the detected turbulence as well as the geometric parameters which characterize it. This method makes it possible to detect wake turbulence and to determine at one and the same time the position and the strength of the latter as well as its stage of evolution.

8 Claims, 6 Drawing Sheets

U.S. PATENT DOCUMENTS

| | | | | |
|---|---|---|---|---|
| 3,567,915 A | * | 3/1971 | Altshuler et al. | 342/26 R |
| 3,573,824 A | * | 4/1971 | Armstrong et al. | 342/26 D |
| 3,646,555 A | * | 2/1972 | Atlas | 342/26 R |
| 3,715,748 A | * | 2/1973 | Hicks | 342/26 D |
| 3,803,601 A | * | 4/1974 | Serafin | 342/26 R |
| 4,219,887 A | * | 8/1980 | MacCready, Jr. | 342/26 D |
| 4,222,265 A | * | 9/1980 | Ravussin | 342/26 D |
| 4,761,650 A | * | 8/1988 | Masuda et al. | 342/26 D |
| 4,835,536 A | * | 5/1989 | Piesinger et al. | 342/26 D |
| 5,164,731 A | * | 11/1992 | Borden et al. | 342/26 B |
| 5,208,600 A | | 5/1993 | Rubin | |
| 5,262,773 A | * | 11/1993 | Gordon | 340/968 |
| 5,285,256 A | * | 2/1994 | Nelson et al. | 340/945 |
| 5,359,888 A | * | 11/1994 | Hagen | 73/178 R |
| 5,639,964 A | * | 6/1997 | Djorup | 73/170.12 |
| 5,657,009 A | * | 8/1997 | Gordon | 340/968 |
| 5,724,040 A | * | 3/1998 | Watnick | 342/26 D |
| 5,729,465 A | | 3/1998 | Barbaresco | |
| 5,845,874 A | * | 12/1998 | Beasley | 244/1 R |
| 6,062,076 A | * | 5/2000 | Johari et al. | 73/170.13 |
| 6,177,888 B1 | * | 1/2001 | Cabot et al. | 340/968 |
| 6,424,408 B1 | * | 7/2002 | Ooga | 342/36 |
| 6,480,142 B1 | | 11/2002 | Rubin | |
| 6,755,080 B2 | * | 6/2004 | Martin | 73/170.13 |
| 6,828,923 B2 | * | 12/2004 | Anderson | 342/26 B |
| 7,284,421 B2 | * | 10/2007 | Martin | 73/170.13 |

FOREIGN PATENT DOCUMENTS

FR 2890450 A1 3/2007

OTHER PUBLICATIONS

Marshall, et al, 1996. "Wingtip generated wake vortices as radar targets." Proceedings of the IEEE National Radar Conference, pp. 184-189.

* cited by examiner

METHOD FOR RADAR MONITORING OF WAKE TURBULENCE

CROSS REFERENCE TO RELATED APPLICATIONS

The present application is the U.S. National Phase of International Patent Application Serial No. PCT/EP2008/055864, filed May 13, 2008, which claims the benefit of French Patent Application Serial No. 07/03479, filed May 15, 2007, both of which are hereby incorporated by reference in their entireties.

FIELD OF THE INVENTION

The present invention relates to the field of air traffic control and air safety in general. It relates more particularly to the safety, rules which govern the relative distances between aircraft following one behind another along one and the same air corridor, notably during the takeoff phases and during the approach and landing phases.

BACKGROUND OF THE INVENTION

In the field of air traffic control, the safety distances between airplanes, standards dictated by the ICAO (International Civil Aviation Organization), have been established so as to avoid the dangers related to the encountering by airplanes of the wake turbulence (or "Wake Vortex" as it is also known) generated by an airplane in front of them. Such turbulence is indeed particularly dangerous when the airplane which passes through it is in a situation of vulnerability, such as that which it experiences during the takeoff and landing phases, in particular at the point of entry into the ILS (i.e. "Instrument Landing System") guidance zone for runway approach on landing, while it is situated a relatively small distance from the ground and in relatively congested navigation zones.

Currently, for safety reasons, and because the evolution of such turbulence over time is relatively poorly known, the distances separating two aircraft, imposed by the ICAO, correspond to significant safety margins. These safety distances do not in particular take into account meteorological conditions (natural turbulence of the atmosphere) which condition the rate of fading of the phenomenon, nor the aerological conditions (crosswind for example) which condition its movement through space.

Faced with the constant and rapid increase in air traffic and with the arrival of new wide-bodied airplanes (Airbus A380 and Boeing B747-8), a dual problem arises related to the following two conflicting constraints:

- a first constraint gives expression to the fact that a wide-bodied airplane produces greater wake turbulence than a medium-bodied or narrow-bodied airplane. Hence, and in the absence of complementary parameters, the safety distance that must be complied with by an airplane which is following a wide-bodied craft must naturally be, in absolute terms, greater than in the case where the same airplane is following a medium-bodied or a narrow-bodied craft; in particular in the takeoff and landing phase. This constraint results in a predictable lengthening of the waiting times during takeoffs and landings for airplanes situated behind a wide-bodied craft.
- a second constraint gives expression to the fact that in order to handle ever greater air traffic, it is necessary to accelerate the rotations so as to avoid clogging up air terminals.

Faced with these conflicting constraints, one solution consists in complicating the airport infrastructures so as to allow aircraft to follow, both on takeoff and on landing, diversified trajectories (corridors), so that two airplanes can follow one another relatively closely by moving along different takeoff or landing axes allowing each airplane not to pass through the wake of the airplane in front while the wake turbulence is still dangerous. However this solution, in addition to the fact that it requires the installation of relatively sophisticated guidance equipment, lacking in many airports, furthermore does not make it possible to determine whether the safety distance applied in this or that circumstance is a just sufficient distance or whether conversely it is too widely estimated.

Another known solution consists in trying to detect the presence of wake turbulence and the distance of such turbulence by means of sensors. Various types of sensors have been studied for the detection of wake turbulence, and in particular the Doppler Lidar, pulsed Laser emission systems making it possible to carry out a Doppler measurement. The major drawback of this type of sensor for operational use is that it can only operate correctly in clear weather. In fog and rain, the Lidar can no longer be employed. Moreover the Lidar, although possessing good angular resolution, better in particular than a Radar, has lower distance and Doppler resolutions. In particular, the Lidar is incapable of measuring certain details on the geometry of the turbulence spiral which make it possible in particular to determine its state of fading so that insufficient knowledge of the detected turbulence is obtained. Moreover, current Lidar systems are not able to monitor, in a time span compatible with operational requirements, a sufficiently wide sector of space to allow effective monitoring of an airport zone.

SUMMARY OF THE INVENTION

An aim of the invention is to propose a scheme making it possible, within the general context of airport traffic, to determine for a given airplane whether it is a sufficient distance from the airplane in front on its route so as not to experience the effects of the wake turbulence caused by the airplane in front while itself being in a vulnerable situation, in the takeoff or landing phase for example.

The issue here is to be able to determine in real time and in all weathers (clear weather, fog, rain, etc.) the behavior of such wake turbulence so as to be able, as a function of the configuration of the runways and of the weather conditions, to adjust in a dynamic manner the safety distance between airplanes, while ensuring a high level of security.

For this purpose the subject of the invention is a method for detecting and grading the state and the evolution of wake turbulence caused by an aircraft, on the basis of the radar signals reflected by this turbulence, these signals being analyzed through analysis cells of given dimension in terms of distance and bearing, characterized in that it comprises:

- a first preliminary main detection step proper for detecting and locating turbulence in a cell,
- a second main step for determining the strength of the detected turbulence,
- a third main step for determining the age of the detected turbulence as well as the geometric parameters which characterize it;

the second and the third step being implemented in parallel, independently of one another, for each analysis cell for which turbulence has been detected on completion of the first step.

According to the invention, the first main step itself comprises:

- a first step of high-resolution spectral decomposition a second step of calculating the entropy S of the high-resolution Doppler spectrum of the signal received, a third step of detecting the presence of turbulence for each observation cell, by comparison with a fixed threshold of the level of the entropy S measured for this cell;

this first main step providing an indication regarding the position of the detected turbulence and an indication regarding the richness of the spectrum of the corresponding signal received.

According to the invention, the second main step itself comprises:

a first step of spectral decomposition by Fourier transformation of the signal received, a second step of normalizing the Doppler spectrum obtained, a third step of detecting the components of significant level of the Doppler spectrum, by comparison with respect to a fixed threshold, a fourth step of calculating the circulation $\Gamma$ of the tangential speed V(r) within the turbulence, a fifth step of calculating the variance L of the tangential speed V(r) on the basis of the significant components of the Doppler spectrum;

this second main step providing an indication regarding the strength of the detected turbulence According to the invention, the third main step itself comprises:

a first step of determining the frequency components of the high-resolution Doppler spectrum of the signal received by determining the roots of the characteristic polynomial of the autoregressive model of the signal received a second step of analyzing the density of the components of the Doppler spectrum and the slope of the variation of the value of these components over the analysis time;

this third main step providing an indication regarding the stage of evolution of the detected turbulence and an indication regarding the geometry of the latter.

DESCRIPTION OF THE DRAWINGS

The characteristics and advantages of the invention will be better appreciated by virtue of the description which follows, which description sets forth the invention through a particular embodiment taken as nonlimiting example and which appertains to the appended figures, which figures present.

DETAILED DESCRIPTION

FIGS. 1 to 4, which illustrate in a schematic manner the wake turbulence phenomenon created by an aircraft 11, are considered initially. As illustrated by these three figures, the wake turbulence is materialized by the creation to the rear of the aircraft of two swirls 21 and 22 (vortices) which cause oppositely directed rotations of the air mass. One thus speaks of "counter-rotating" eddies.

Figure 1:
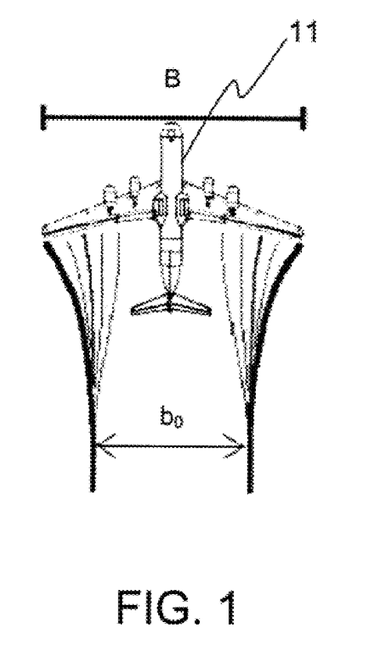
FIGS. 1 to 3, schematic illustrations of the phenomenon of wake turbulence.
Figure 2:
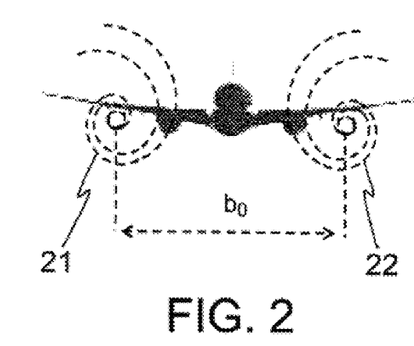
Figure 3:
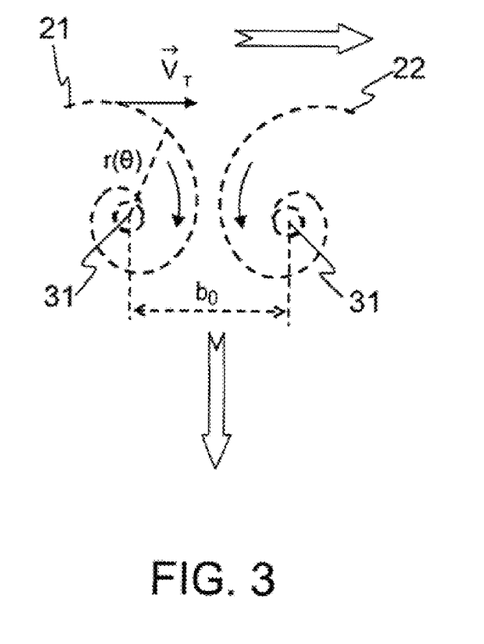

Each eddy 21, 22 takes the form of a spiral whose points are situated with respect to the center at a distance $r(\theta)$ varying exponentially as a function of the number of revolutions performed in order to join the point under consideration to the center. It is thus possible to write the relation:

$$r(\theta) = a \cdot e^{b\theta} \text{ for } \theta \text{ varying from 0 to } N\pi \text{ (N integer).} \quad [1]$$

where a and b represent the geometric parameters of the spiral.

Each eddy is furthermore characterized by its nucleus 31 of radius $r_c$.

It is known to evaluate the danger related to the wake turbulence caused by an aircraft, by determining the value of certain physical characteristics.

Thus, turbulence is generally characterized by its size, through the distance $b_0$ which separates the centers of the two eddies (vortices) which constitutes it. This distance is given by the following relation:

$$b_0 = s \cdot B \quad [2]$$

in which B represents the wingspan of the airplane, as illustrated by FIG. 1.

The factor s is for its part equal to $\pi/4$, so that $b_0$ is substantially equal to ¾ of the wingspan B.

This turbulence is also characterized, in a known manner, by the tangential speed of the air mass inside the two eddies 21 and 22. This speed follows an exponential law, with increase in the tangential speed from the center toward the periphery inside the core 31 of the eddy at the radius $r_c$ of the core, and a decrease as a function of the radius $r(\theta)$ outside the core. It can thus be defined in a known manner by the following relations:

$$v(r) = \frac{r}{r_c} \cdot V_{max} \quad [3]$$
$$\text{for } 0 \le |r| \le r_c$$
and
$$v(r) = \frac{r_c}{r} \cdot V_{max} \quad [4]$$
$$\text{for } r_c \le |r|$$

$V_{max}$ being defined by the relation:

$$V_{max} = \frac{\Gamma}{2 \cdot \pi \cdot r_c} \quad [5]$$

where $\Gamma$ represents the circulation of the vector V along the spiral forming the eddy.

The tangential speed inside the eddies can thus reach on average, or indeed exceed, +/−10 m/s.

This turbulence is also characterized, in a known manner, by the circulation $\Gamma$ of the speed of the air masses in the turbulence. The circulation $\Gamma$ which represents the kinetic moment (in m²/s) of the tangential speed of the air mass (integral of the product of the tangential speed $V_T$ of the eddy times its radius $r(\theta)$) makes it possible to characterize the strength of the wake turbulence. The initial value of the circulation, $\Gamma_0$, is defined as a quantity proportional to the weight of the airplane and inversely proportional to its wingspan and its speed. It is thus possible to write:

$$\Gamma_0 = \frac{M \cdot g}{\rho \cdot V \cdot s \cdot B} \quad [6]$$

where M represents the mass of the aircraft, V its speed and B its wingspan.

The parameters g, ρ and s represent for their part respectively the acceleration due to gravity, a parameter characteristic of the geometry of the wings of the aircraft and a factor equal to π/4.

Figure 4:
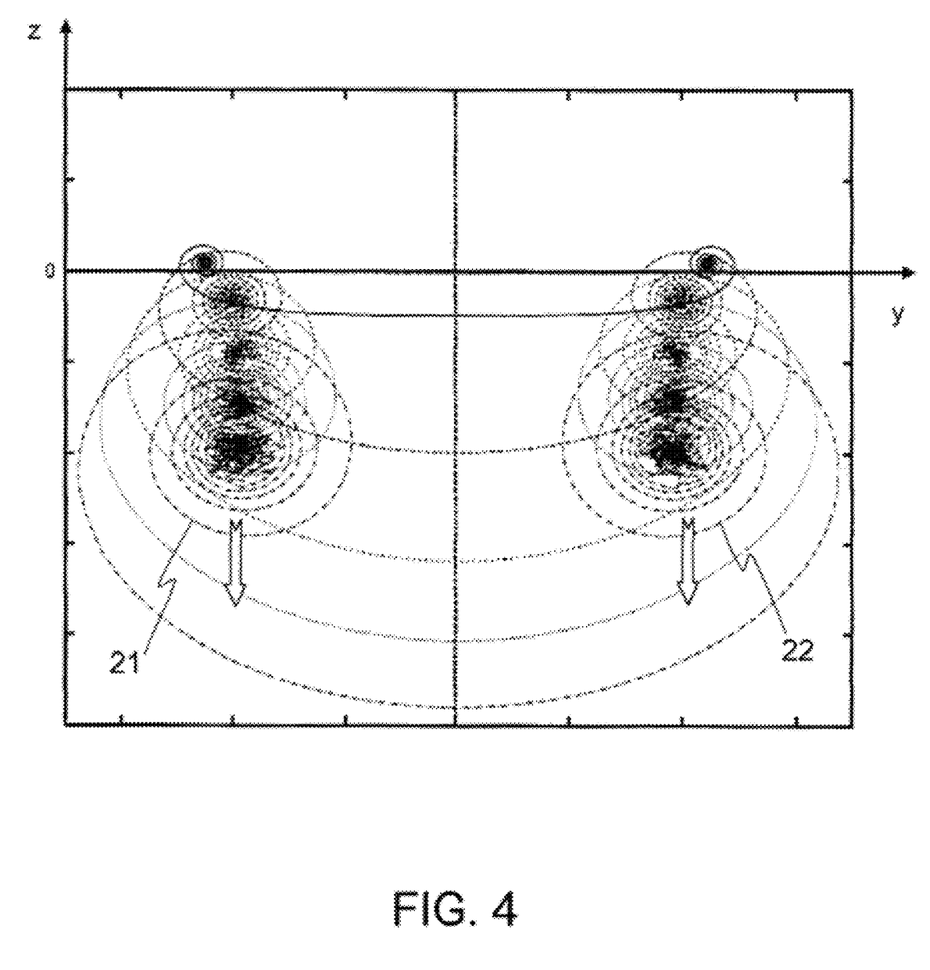
FIG. 4, an illustration of the evolution of such turbulence over time.

It is moreover known that the wake turbulence created by an aircraft evolves over time, this evolution as. As illustrated by FIG. 4, the two eddies 21 and 22 evolve over time. They thus naturally lose altitude (because of the counter-rotation) with a speed $V_d$ inversely proportional to the wingspan B of the aircraft, given by the following relation:

$$V_d = \frac{\Gamma_0}{2 \cdot \pi \cdot b_0} = \frac{\Gamma_0}{2 \cdot \pi \cdot s \cdot B} \quad [7]$$

A descent speed of the order of 2 m/s on average is thus obtained for airplanes of average size.

This wake turbulence may furthermore experience the influence of the wind so that the two eddies, or vortices, are also subjected to the possible action of the wind and may be transported by the crosswind.

Moreover it is known that when turbulence is situated in proximity to the ground, it is also subjected to other more complex phenomena, such as wind shear phenomena which rotate each eddy one with respect to the other, or else phenomena of rebound from the ground giving rise to spurious mirror eddies.

Finally, it is known that, in a natural manner, wake turbulence decays and dies out as a function of the natural turbulence of the atmosphere, characterized by the quantities TKE ("Turbulent Kinetic Energy") and EDR ("Eddy Dissipation Rate"), and also under the action of "Crow wave" related self-destruction phenomena linked with the swirling of the eddies around themselves. This decay and this death result in particular in a progressive loss of strength and a decrease in the speed of the air masses within the turbulence. Thus a given turbulence undergoes a phase of growth, followed by a phase of decay and extinction.

As far as wake turbulence is concerned, investigations, conducted among aircraft pilots, have shown that the most dangerous zones during the approach to an airport are two in number. The first zone corresponds to the ILS interception zone (entry point of the approach cone defined by the ILS situated from 700 m to 1000 m above the ground). In this zone, indeed, airplanes coming from various directions align themselves with the descent axis defined by the ILS while generating at this point wake turbulence that an aircraft entering the approach cone will have to pass through. The second zone corresponds to the final ground approach because of the rebound phenomena described above. For these two zones, in which aircraft maneuver close together at low or indeed very low altitudes, it is therefore necessary that each aircraft be able not only to detect the presence of turbulence ahead of it, but also that this aircraft be able to estimate the strength of the disturbance generated by the turbulence detected.

Figure 5:
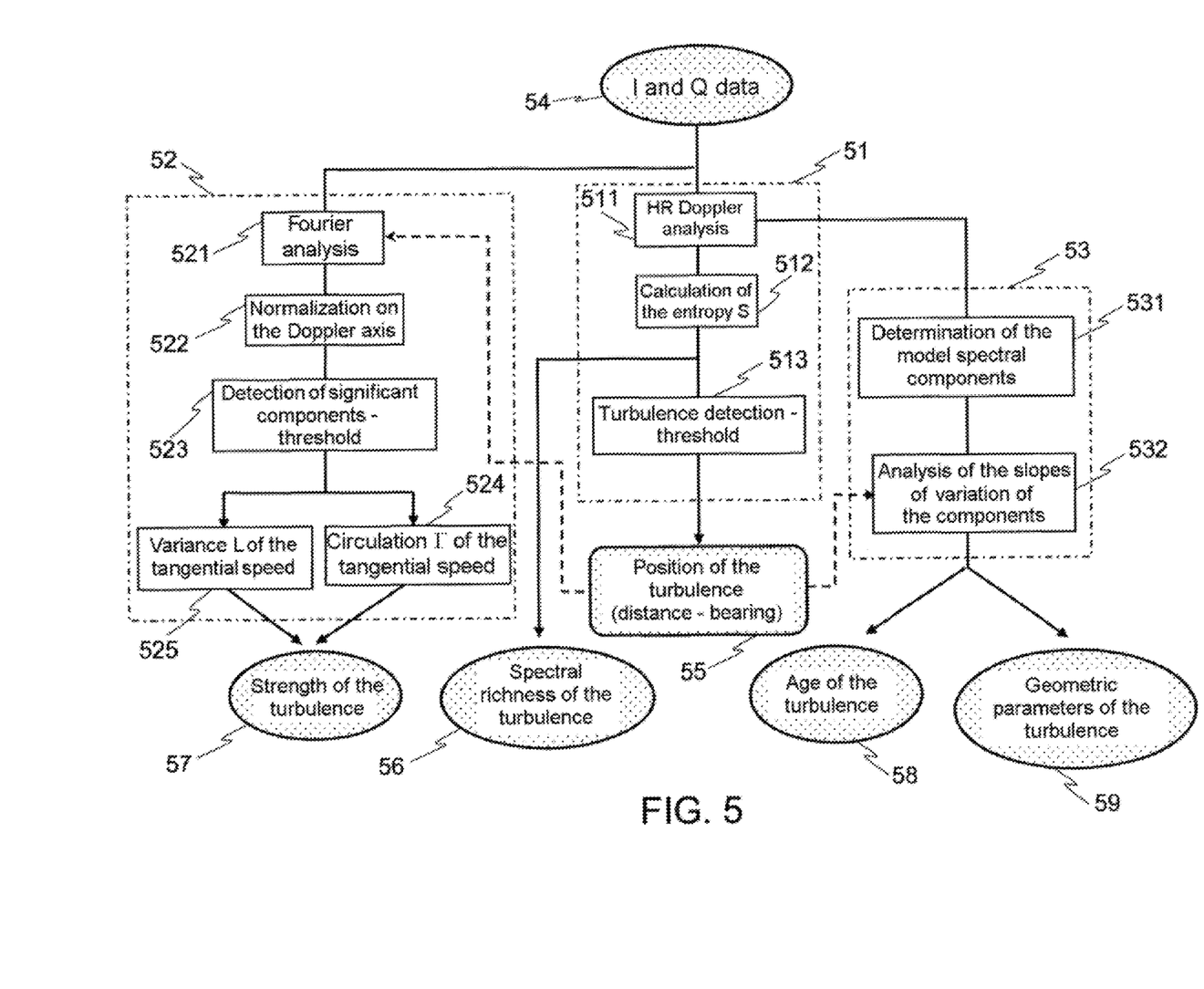
FIG. 5, a basic schematic of the method according to the invention.

FIG. 5, which presents the basic flowchart of the method for detecting and characterizing wake turbulence, is now considered.

The method according to the invention carries out for this purpose three distinct main steps:
- a first preliminary main detection step 51 proper which makes it possible to detect and to locate turbulence,
- a second main step 52 which makes it possible to determine the strength of the detected turbulence,
- a third main step 53 which makes it possible to determine at one and the same time the age of the detected turbulence as well as the geometric parameters which characterize it.

The data 54 processed by the method according to the invention consist of the samples of received radar signal. Each signal sample corresponds here in a known manner to the signal originating from a cell of space determined by its radial distance and its bearing and its size in terms of distance and bearing, which size defines in a known manner the resolution of the signal received. Each signal sample is defined in terms of amplitude and phase by a real component I and an imaginary component Q.

On the basis of these input data, the method according to the invention delivers the following indications:
- the position 55 of the detected turbulence,
- an indication 56 regarding the spectral richness of the corresponding signal,
- indications 57 relating to the strength of the detected turbulence,
- an indication 58 regarding the age of the detected turbulence,
- the value 59 of the geometric parameters characterizing the turbulence.

According to the invention the detection task 51 is carried out in several steps:
- a first step 511 of high-resolution Doppler analysis of the signal received,
- a second step 512 of calculating the entropy of the Doppler spectrum determined in the previous step,
- a third step 513 of detection itself.

The high-resolution Doppler analysis step 511 is carried out by implementing an analysis scheme based on autoregressive filtering making it possible to determine for each (distance, azimuth) cell a spectral model of the signal received through its reflection coefficients $\mu_n$ on the basis of restricted signal sample sequences. To calculate the coefficients $\mu_n$ it is possible to use any known scheme such as the trellis algorithm of Burg for example. However, in a preferred manner of implementing the method according to the invention, the scheme implemented to determine the order of the model and the coefficients $\mu_n$ is the Doppler analysis scheme based on "regularized autoregressive" filtering, described in French patent applications filed by the Applicant on Jun. 13, 1995 under the number 95 06983, and on Sep. 6, 2005 under the number 05 09095, which scheme makes it possible to satisfactorily estimate the coefficients $\mu_n$ of the autoregressive model on the basis of a restricted signal sample series. This scheme, not detailed here, consists in particular in associating a block-wise autoregressive trellis filtering implementing Burg's algorithm or else an algorithm of "MUSIC" (Multiple Signal Classification) type with a so-called regularization scheme consisting in applying to each coefficient $\mu_n$ obtained a coefficient making it possible advantageously to limit the consequences of the numerical instabilities engendered by the autoregressive filtering when a small number of samples is available. The coefficients $\mu_n$ obtained are then termed "regularized".

Step 511 is followed by a step 512 during which the coefficients $\mu_n$ are used to calculate the entropy S of the Doppler spectrum obtained. The expression for this entropy, which characterizes the richness of the spectrum in spectral components, is:

$$S = \sum_{k=2}^{N-1} (n-k) \cdot \left( \frac{1}{2} \cdot \ln\left( \frac{1+|\mu_k|}{1-|\mu_k|} \right) \right)^2 \quad [8]$$

where N represents the number of coefficients $\mu_n$ of the model defined in step 511.

Accordingly, in the course of step 513, the entropy S calculated for each of the (distance, azimuth) cells is compared with a threshold $S_1$, fixed as a function of detection probability and false alarm probability criteria. In this way, each cell exhibiting an entropy S greater than the threshold $S_1$ is detected and considered to be a zone where the air mass exhibits a disturbance linked with wake turbulence. A mapping of the (distance, azimuth) cells in which it has been possible to detect turbulence is thus available on completion of step 513 of the task 51.

According to the invention, the object of the task 52 is to characterize the strength of the detected turbulence. It therefore applies only to the cells for which the task 51 has produced a detection. Like the task 51 it is also carried out in several steps:
- a first step 521 during which a conventional spectral analysis of the spectrum of the signal received is performed,
- a second step 522 of normalizing the level of the spectral components,
- a third step 523 of detecting the significant spectral components,
- a fourth step 524, during which the circulation $\Gamma$ of the tangential speed characterizing the turbulence is calculated,
- a fifth step 525, during which the variance L of this same tangential speed is calculated.

The first step 521 is carried out by applying the conventional spectral analysis scheme, by Fourier transformation for example. This spectral analysis makes it possible to determine the components of the Doppler spectrum which characterizes the turbulence. It is followed by step 522 the object of which is to normalize the Doppler spectrum obtained with respect to an ambient signal level in the frequency plane. This normalization of the spectrum of the signal on the frequency axis can for example be carried out for each frequency on the basis of the mean value and the variance of the level of the spectrum in the neighborhood of the frequency considered, by known methods of CFAR type (i.e. "Constant False Alarm Rate").

The normalization step 522 is followed by a step 523 of detecting the significant spectral components, that is to say spectral components which characterize the turbulence. Like during step 513, the detection is carried out here by comparing the normalized level of each spectral component with a threshold $S_2$. Each of the components whose level exceeds the threshold, is here retained so as to characterize the turbulence.

The significant spectral components having been determined, step 524 proceeds to the calculation of the circulation $\Gamma$ of the tangential speed of the air masses in the cell considered. The latter is defined in a known manner (to within an arbitrary factor) by the following proportionality relation:

$$\Gamma \propto \frac{2 \cdot \int_{V_{min}}^{V_{max}} V_i^2 \cdot [F(V_i)]^{2/3} \cdot dV_i}{\int_{V_{min}}^{V_{max}} [F(V_i)] \cdot dV_i} \quad [9]$$

where $F(V_i)$ represents the value of the speed component $V_i$ (of frequency $f_i$) under consideration of the Doppler spectrum of the signal received.

This circulation represents, as was stated previously, the kinetic moment (in m²/s) of the tangential speed of the air masses within the turbulence, that is to say the integral of the product of the tangential speed $V_T$ of the motion of the air mass at a point of the vortex under consideration times the distance $r(\theta)$ of this point from the center of the vortex. It makes it possible advantageously to characterize the overall strength of the wake turbulence detected in the (distance, azimuth) cell considered.

In parallel with step 524, step 525 proceeds for its part, on the basis of the significant spectral components, to the calculation of the reduced variance L of the tangential speed of the air masses in the cell considered. The latter is defined in a known manner (to within an arbitrary factor) by the following proportionality relation:

$$L \propto \frac{\int_{V_{min}}^{V_{max}} V_i^2 \cdot [F(V_i)] \cdot dV_i}{\int_{V_{min}}^{V_{max}} [F(V_i)] \cdot dV_i} \quad [10]$$

Like the circulation $\Gamma$, the variance L makes it possible advantageously to characterize the overall strength of the wake turbulence detected in the (distance, azimuth) cell considered. Indeed it characterizes the dispersion of the disturbance of the air masses created by the turbulence and therefore the greater or lesser degree of agitation of these air masses.

On completion of steps 524 and 525 of the task 52, two indications L and $\Gamma$ making it possible to characterize the strength of the turbulence detected are obtained for each cell in which turbulence has been detected, for which cell the task 51 provides the position.

According to the invention, the task 53 has for its part the dual object of allowing the determination of certain geometric parameters relating to the detected turbulence, as well as of making it possible to determine the age of the turbulence or more exactly its degree of evolution. For this purpose, it comprises the following steps:
- a first step 531 which performs, for each of the (distance, bearing) cells, the determination of the components of the Doppler spectrum of the signal received,
- a second step 532 which performs, only for the cells in which turbulence has been detected, the analysis of the variations over time of the frequencies of the spectral components of the signal.

The first step 531 is carried out on the basis of the autoregressive model determined during the high-resolution Doppler analysis step 511. It consists mainly in determining the natural frequencies of the model by calculating the roots of the polynomial characterizing the model. A fine spectral decomposition of the signal received is thus advantageously obtained.

The second step 532 consists for its part in analyzing the evolution of the Doppler spectrum over an analysis time interval $\Delta t$ during which the radar detection means are directed onto the (distance, azimuth) cell considered. According to the invention for each cell in which turbulence has been detected, the slope of the variation, over time, of the frequency of each of the components of the Doppler spectrum is estimated. This analysis advantageously makes it possible as illustrated by FIGS. 6 to 8 to determine the stage of evolution of the detected turbulence.

Figure 6:
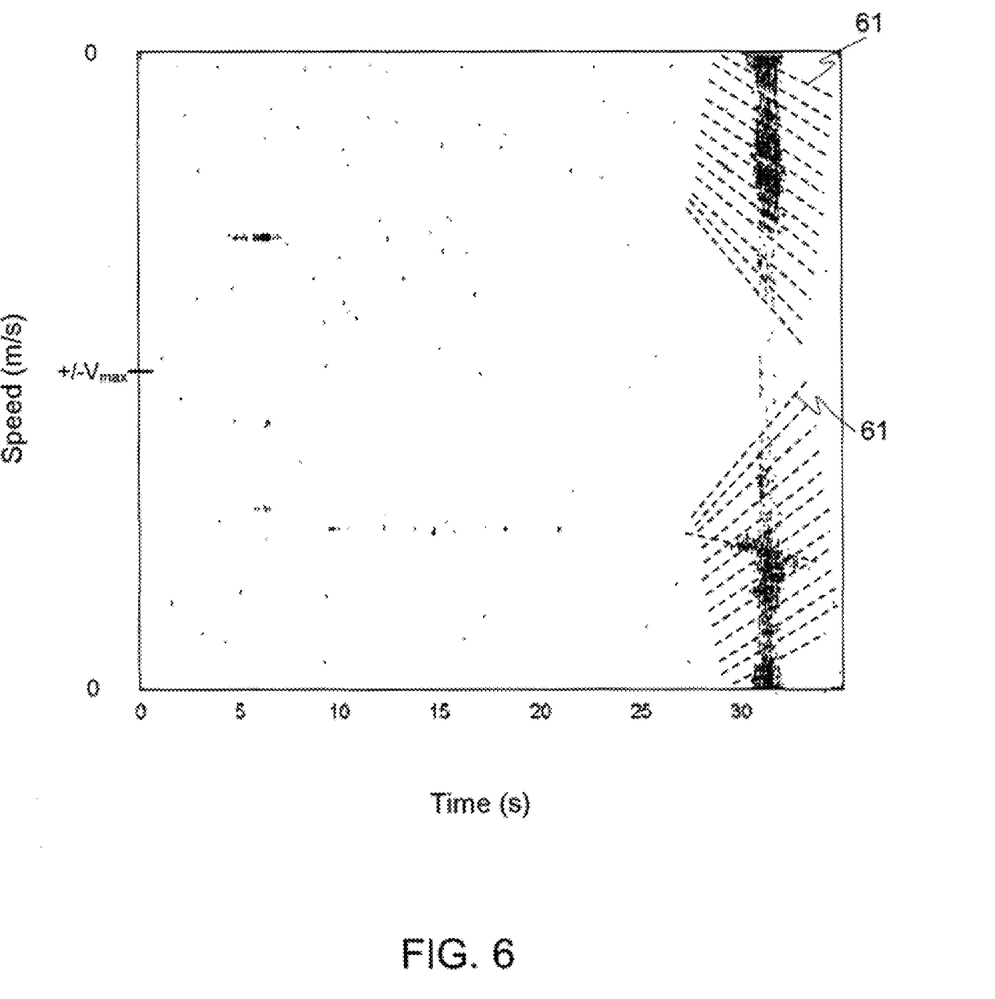
FIG. 6 a spectrogram representing in a schematic manner the evolution of the components of the Doppler spectrum of the signal corresponding to recently formed threshold wake turbulence, FIG. 7, a spectrogram representing in a schematic manner the evolution of the components of the Doppler spectrum of the signal corresponding to currently evolving threshold wake turbulence, FIG. 8, a spectrogram representing in a schematic manner the evolution of the components of the Doppler spectrum of the signal corresponding to threshold wake turbulence in the process of disappearing.

FIG. 6 presents in a schematic manner in the (time, Doppler speed) plane, for a given (distance, azimuth) cell, the evolution over time of the frequency of the spectral components of the signal corresponding to recently formed turbulence. It should be noted that in the representation of FIG. 6, as in those of FIGS. 7 and 8, the Doppler frequencies are represented by the corresponding speeds expressed in m/s.

As may be noted in the figure, the turbulence is characterized by a spectrum whose components expressed in the space of the Doppler speeds (i.e. lying between 0 m/s and $\pm V_{max}$) are numerous and tightly packed. Furthermore these components all exhibit evolution slopes 61 of positive sign, the value of each of the components increasing over time. At this stage of evolution, the turbulence therefore sees its tangential speed increase and with it its strength. It is therefore advisable to signal to any aircraft approaching the zone corresponding to the cell under consideration that this zone is highly disturbed and that the disturbance has not reached its maximum.

Figure 7:
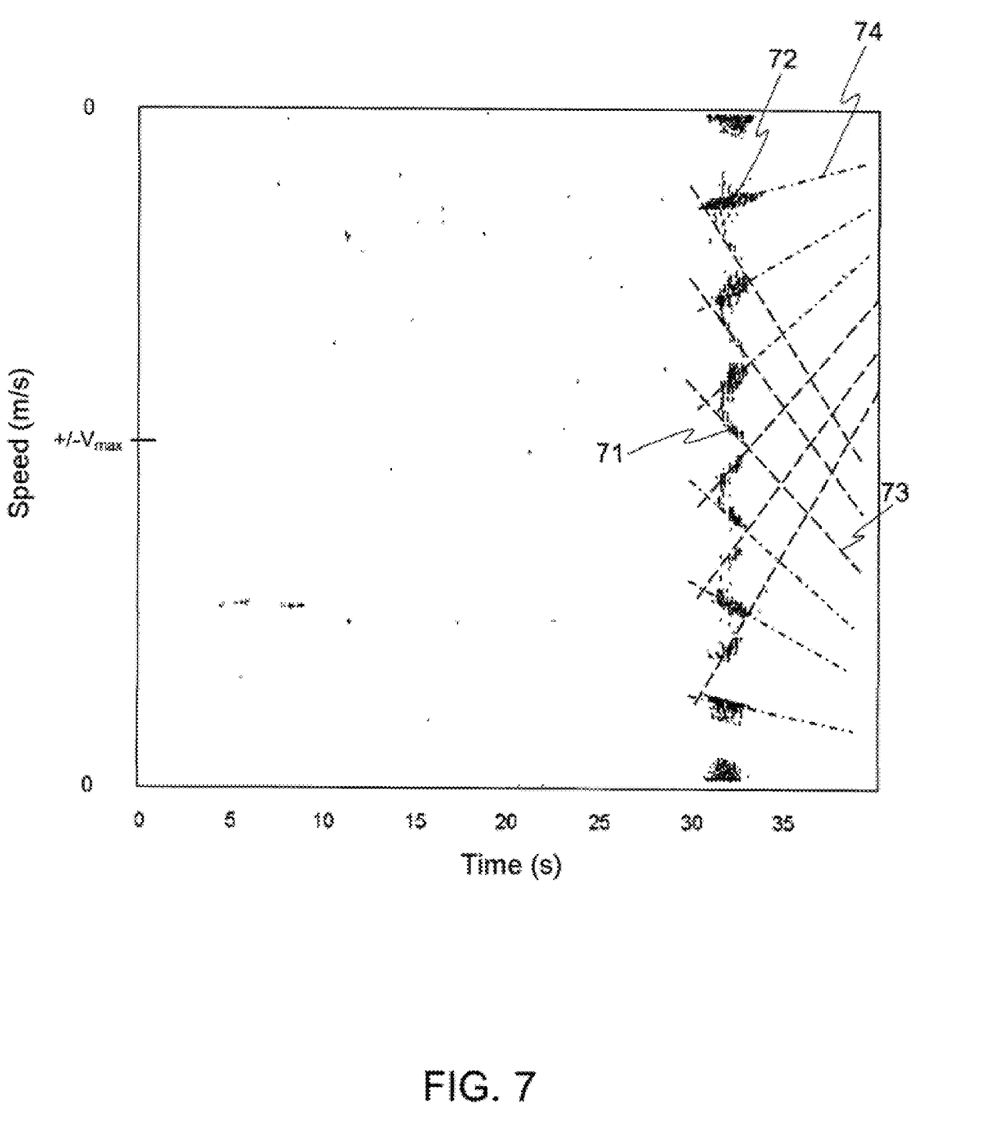
Figure 8:
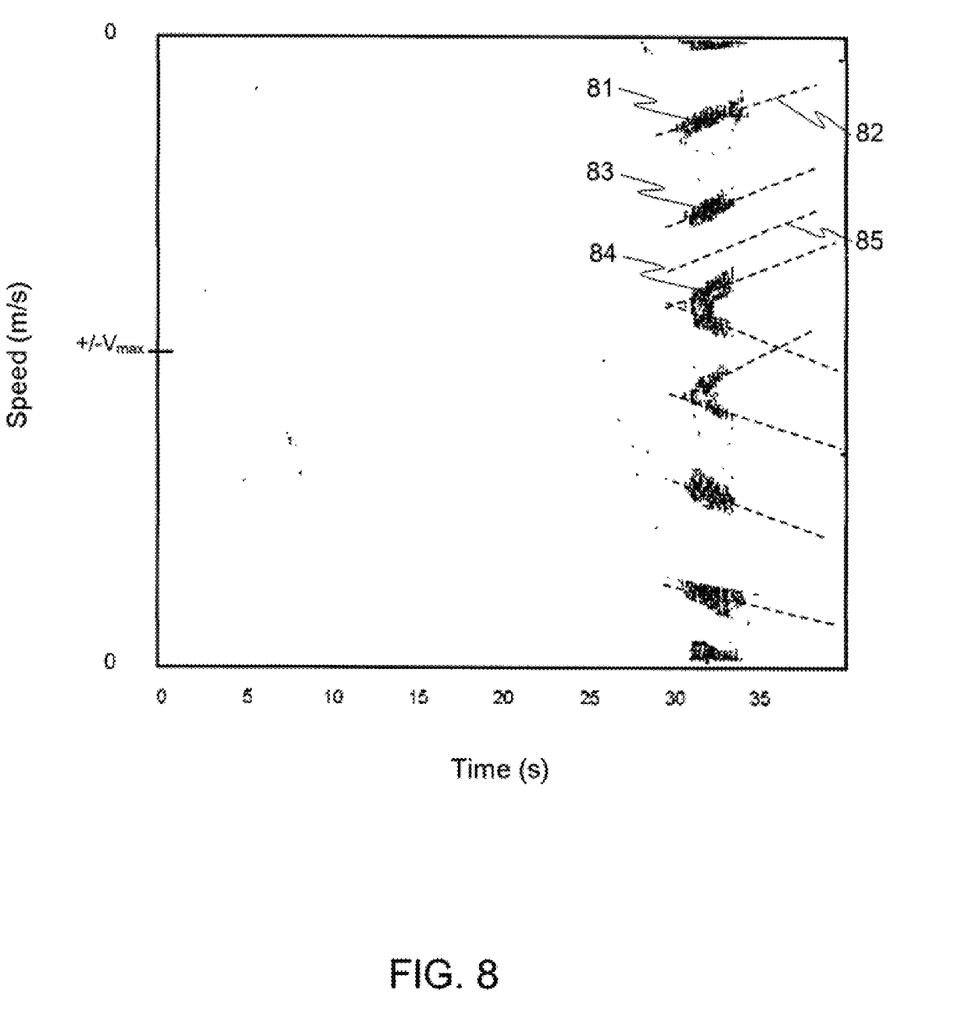

FIG. 7 presents in the same manner the evolution over time of the frequency of the spectral components of the signal corresponding to a turbulence that may be graded as mature. Such turbulence is characterized by a spectrum whose components are less numerous and spaced further apart. Furthermore for certain of these components 71 the Doppler frequency (and therefore the speed) increases over time, while for certain others 72 the Doppler frequency (and therefore the speed) decreases over time. Certain spectral components thus exhibit evolution slopes 73 of positive sign and others evolution slopes 74 of negative sign. Such turbulence therefore sees its tangential speed decrease with respect to the previous stage of evolution, which decrease finds its expression in the fading of the disturbance engendered by the turbulence and as a consequence of the danger that the latter may represent for an aircraft entering the (distance, bearing) cell occupied by the disturbance considered.

FIG. 8 presents, in the same manner, the evolution over time of the frequency of the spectral components of the signal corresponding to turbulence in the process of extinction. As may be noted in the figure, the turbulence is characterized by a spectrum with few components 81 spread out in frequency. Furthermore these components all exhibit evolution slopes 82 of negative sign, the Doppler frequency (and therefore the speed) of each of the components decreasing over time. At this stage of evolution, the turbulence therefore sees its tangential speed decrease and with it its strength. Such turbulence in the process of extinction now produces, although still being detectable, only a moderately intense disturbance of the air masses in the cell considered. Depending on the size of the aircraft liable to pass through it, it therefore now represents, if not no threat, at least only a moderate threat.

The estimation of the slopes of variation of the speeds over time can be carried out by various known graphical, semi-graphical or else algebraic processes, on the basis of the natural frequency values provided by-step 531. These processes known elsewhere are not described here. The observation time $\Delta t$ is for its part determined as a function of the radar detection equipment used and in particular, in the cases of a scanning radar, by the time interval separating two periods of transit of the radar beam in the same direction of observation and therefore over the same (distance, bearing) cell.

In addition to the determination of the stage of evolution of the detected turbulence, the determination of the slopes of the evolution of the Doppler frequencies also makes it possible, advantageously, to determine certain parameters related to the geometry of the turbulence, in particular the factor b of relation [1] defining $r(\theta)$ and characterizing the aperture of the spiral constituting an eddy (vortex) 21.

Indeed, if relations [3] and [5] are considered, it is possible to write:

$$v(r) = \alpha \cdot r \quad [11]$$

$$\text{with } \alpha = \frac{V_{max}}{r_c} = \frac{\Gamma_0}{2 \cdot \pi \cdot r_c^2} \quad [12]$$

Likewise the increase $\delta r$ in the radius $r(\theta)$ corresponding to a complete revolution ($\Delta\theta = 2\pi$) around the spiral about its center can be defined by the following relation:

$$r = ae^{b\theta} \Rightarrow r + \delta r = ae^{b(\theta + 2\pi)} = r \cdot e^{b2\pi} \Rightarrow \frac{r + \delta r}{r} = e^{b2\pi} \quad [13]$$

$$\frac{\delta r}{r} = e^{b2\pi} - 1 \quad [14]$$

In this way, by considering relations [12] and [14], it is finally possible to write:

$$V(r) = \alpha \cdot r \Rightarrow \frac{\delta V(r)}{V(r)} = \frac{\delta r}{r} \quad [15]$$

$$= e^{b2\pi} - 1 \Rightarrow b = \frac{1}{2\pi} \log\left(1 + \frac{\delta V(r)}{V(r)}\right)$$

Accordingly, knowing the evolution of $V(r)$, it is advantageously possible to estimate the parameter b defining the eddies (vortices) 21 and 22. For this purpose, in practice, the evolution of the Doppler spectrum over time such as represented on the spectrograms of FIGS. 6 to 8 is considered, and the variation $\delta V(r)$ of the speed as a function of the radius is determined by considering the slopes of variation of two spectral components 83 and 84. This variation is thereafter normalized by the mean speed $V_m(r)$ defined by the two chosen spectral components and illustrated by the dashed line 85.

As may thus be noted through the above description, the method according to the invention proposes, beyond what is proposed by the methods of the known prior art, a process for determining, not only the presence of wake turbulence in a given zone of space, but also the strength of this turbulence, that is to say the negative impact that it could have on the flight conditions of an aircraft having to pass through the relevant zone of space.

This characterization of the turbulence is furthermore advantageously supplemented with the characterization of the stage of evolution of the turbulence (turbulence which is young, mature, or in the process of extinction). This indication regarding the stage of evolution makes it possible to determine in particular the time during which the detected turbulence is liable to represent a threat.

This characterization is further advantageously supplemented with the determination of the parameters relating to the geometry of the turbulence, the parameter b in particular.

The association of these indications, provided by the method according to the invention, advantageously makes it possible, when wake turbulence caused by the passage of an aircraft is detected, to determine in an optimal manner, by taking account in particular of the aerology of the zone (presence of crosswind), the most suitable safety distance that must be complied with, for their own safety, by aircraft situated in the wake of the aircraft from which the turbulence originated. This precisely estimated optimal safety distance determined without prior assumption about the aircraft that caused the turbulence can thus be substituted for a safety distance determined a priori simply as a function of the scale of this aircraft.

It should be noted that in the above description, the method according to the invention is described in its most complete form, that comprising a first detection step 51, and then two independent steps 52 and 53 of characterizing the detected turbulence. However, it is of course possible to consider the method according to the invention in simpler forms. Thus, with steps 52 and 53 being independent of one another, it is for example possible to envisage implementing, without departing from the field covered by the patent, simply the detection step 51 and the step 52 of estimating the strength of the detected turbulence; or else simply the detection step 51 and the step 53 of determining the age and the geometric parameters of the detected turbulence.

The invention claimed is:

1. A method for detecting a state or an evolution of wake turbulence caused by an aircraft, on the basis of received radar signals reflected by this turbulence, the received radar signals being analyzed through cells of given dimension in terms of distance and bearing, said method comprising:
   utilizing a radar to receive radar signals reflected by turbulence;
   using the received radar signals to perform a first preliminary detection step for detecting and locating turbulence in a cell;
   using the received radar signals to perform a second step for determining a strength of the detected turbulence; and
   using the received radar signals to perform a third step for determining a degree of evolution of the detected turbulence as well as geometric parameters which characterize the turbulence;
   wherein the second and the third steps are implemented in parallel, independently of one another, for each cell for which turbulence has been detected on completion of the first step.

2. The method as claimed in claim 1, wherein the first step comprises:
   a fourth step of high-resolution spectral decomposition;
   a fifth step of calculating entropy of a Doppler spectrum of the received radar signals; and
   sixth step of detecting the presence of turbulence for each cell, by comparison with a fixed threshold of the level of the entropy measured for this cell;
   wherein the first step provides an indication regarding the position of the detected turbulence and an indication regarding richness of a Doppler spectrum in a spectral component of the corresponding received radar signals.

3. The method as claimed in claim 2, wherein the fourth step implements a regularized autoregressive analysis scheme providing reflection coefficients $\mu_n$ of a determined autoregressive model.

4. The method as claimed in claim 3, wherein during the fifth step, the entropy is calculated on the basis of the following relation:

$$S = \sum_{k=2}^{n-1} (n\_k) \cdot \left( \frac{1}{2} \cdot \ln\left( \frac{1 + |\mu_k|}{1 - |\mu_k|} \right) \right)^2$$

where S is the entropy, and the terms $\mu_k$ represent regularized reflection coefficients of the autoregressive model of the received radar signals.

5. The method as claimed in claim 1, wherein the second step comprises:
   a fourth step of spectral decomposition by Fourier transformation of the received radar signals;
   a fifth step of normalizing a Doppler spectrum obtained;
   a sixth step of detecting components of significant level of the Doppler spectrum, by comparison with respect to a fixed threshold;
   a seventh step of calculating a circulation of a tangential speed within the turbulence; and
   an eighth step of calculating a variance of the tangential speed on the basis of the components of significant level of the Doppler spectrum;
   wherein the second step provides an indication regarding the strength of the detected turbulence.

6. The method as claimed in claim 5, wherein, during the seventh step, the circulation of the tangential speed is determined on the basis of the components of significant level of the Doppler spectrum through the following relation:

$$\Gamma \propto \frac{2 \cdot \int_{V_{min}}^{V_{max}} V_i^2 \cdot [F(V_i)]^{2/3} \cdot dV_i}{\int_{V_{min}}^{V_{max}} [F(V_i)] \cdot dV_i},$$

where $\Gamma$ is the circulation of the tangential speed, and $F(V_i)$ represents the value of a component $V_i$ of the Doppler spectrum.

7. The method as claimed in claim 5, wherein, during the eighth step, the variance of the tangential speed is determined on the basis of the components of significant level of the Doppler spectrum through the following relations:

$$L \propto \frac{\int_{V_{min}}^{V_{max}} V_i^2 \cdot [F(V_i)] \cdot dV_i}{\int_{V_{min}}^{V_{max}} [F(V_i)] \cdot dV_i}$$

where L is the variance of the tangential speed, and $F(V_i)$ represents the value of a component $V_i$ of the Doppler spectrum.

8. The method as claimed in claim 1, wherein the third step itself comprises:
   a fourth step of determining frequency components of a Doppler spectrum of the received radar signals by determining roots of a characteristic polynomial of an autoregressive model of the received radar signals; and
   a fifth step of analyzing a density of the frequency components of the Doppler spectrum and a slope of variation of a value of the frequency components over an analysis time;
   wherein the third step provides an indication regarding a stage of evolution of the detected turbulence and an indication regarding geometry of the turbulence.

* * * * *